July 7, 1936.  J. VAN VLIET ET AL  2,046,802

AIR CONDITIONING APPARATUS

Filed June 7, 1934   2 Sheets-Sheet 1

Inventors
John Van Vliet
Patrick J. Brogan

By J. Kaplan
Attorney

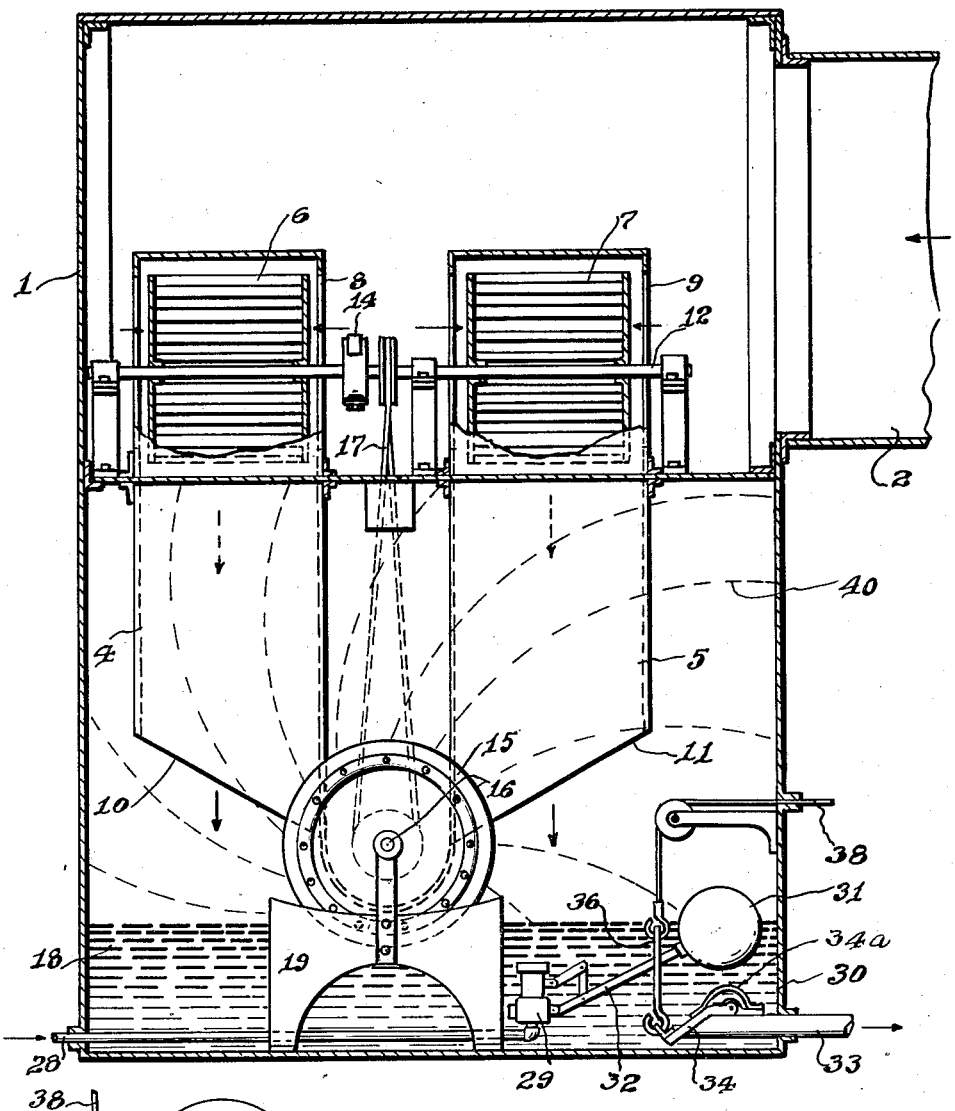
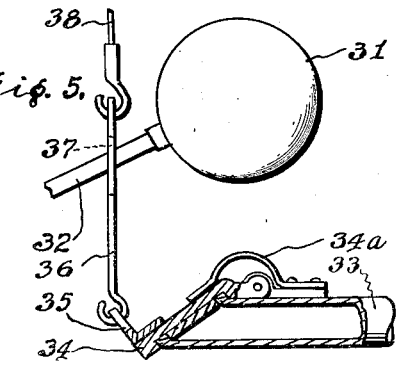
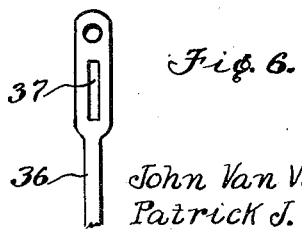

Patented July 7, 1936

2,046,802

UNITED STATES PATENT OFFICE 2,046,802

AIR CONDITIONING APPARATUS

John Van Vliet and Patrick J. Brogan, Chicago, Ill.

Application June 7, 1934, Serial No. 729,514

2 Claims. (Cl. 299—63)

This invention relates to an air conditioning system for homes and more particularly to an apparatus for washing, moistening and tempering the air.

The main object is to provide means to raise a spray and confine the spray within a given area without splashing.

Another object of the invention is to provide a high speed rotating spray wheel to scoop up a supply of water and by centrifugal force cause the water to turn into a fine mist or spray.

Other objects will appear as the disclosure progresses. The drawings are intended to merely indicate a possible embodiment of the invention. It is obvious that the actual needs of manufacture may necessitate certain mechanical changes. It is therefore not intended to limit the invention to the embodiment illustrated but rather to define such limits in the appended claims.

In the drawings

Figure 2 is a section on line 2—2 of Figure 1.

Figure 5 is an enlarged view of the drain outlet operating assembly.

Figure 6 is a fragmentary front view of the float operated stem.

Figure 1:
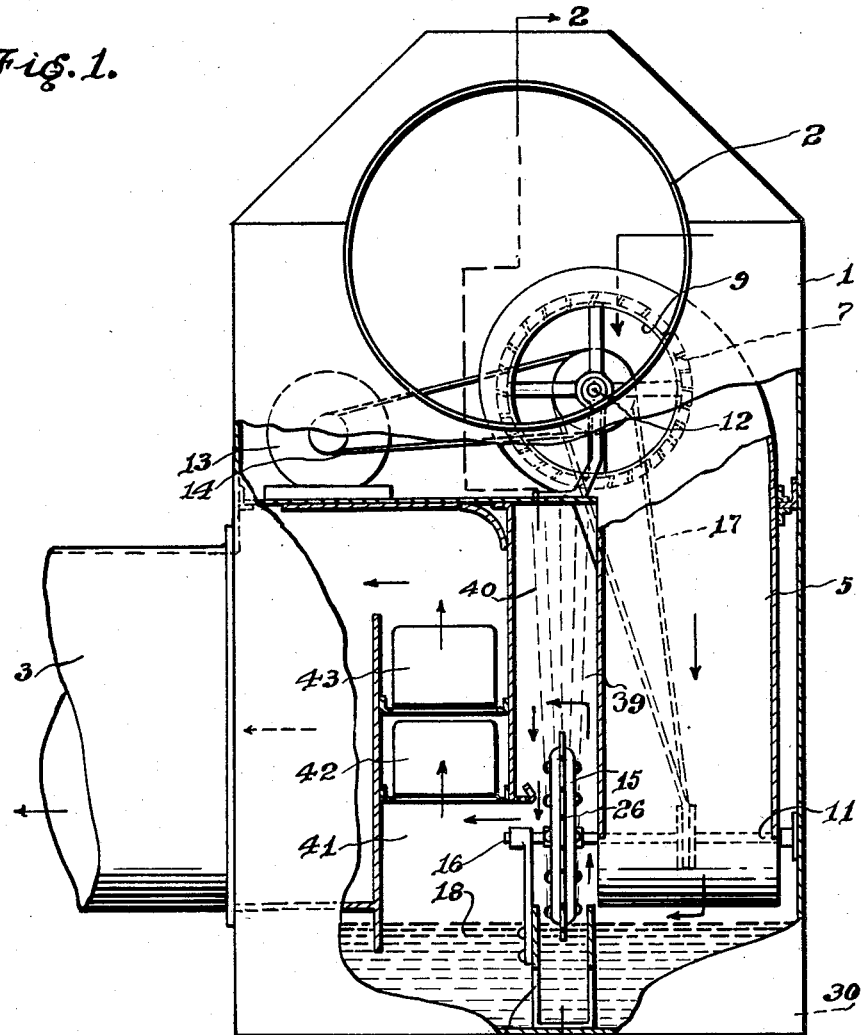
Figure 1 is a side view, partly in section, showing the air conditioning apparatus.
Figure 3:
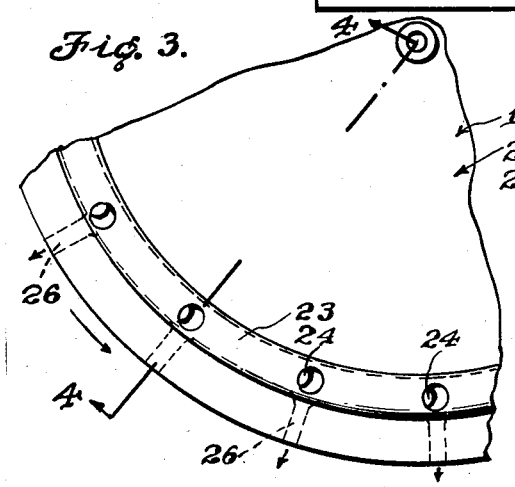
Figure 3 is an enlarged fragmentary view of the spray wheel.
Figure 4:
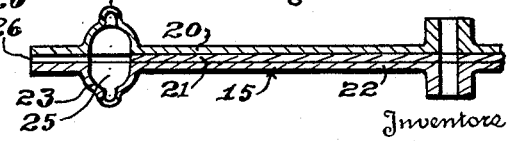
Figure 4 is a section on line 4—4 of Figure 3.

Referring now to the drawings in detail, numeral 1 designates the casing of the air conditioning apparatus, 2 the raw air inlet and 3 the conditioned air outlet. Mounted within the casing are a plurality of vertically disposed ducts 4 and 5 containing high speed fans 6 and 7. The upper portions of the ducts are provided with side openings 8 and 9 for the air to enter and the lower ends are open as at 10 and 11 to allow the air to pass out over a supply of water. The fans are mounted on the shaft 12 and driven by the motor 13 by the way of the belt 14.

At the bottom of the casing is a rotating spray wheel 15 mounted on the shaft 16 and driven from the shaft 12 by the way of the belt 17 and arranged to partially dip in the supply of water 18 at the bottom of the casing. On both sides of the dipped portion of the spray wheel is a trough 19 arranged to prevent the water from splashing sideways as the said wheel revolves. The spray wheel is constructed of a plurality of circular plates 20, 21 and 22 held together by any suitable means and provided with a bulged out circular rim 23 near the periphery. Cut in this rim at spaced intervals are a plurality of angular disposed ears 24. As the spray wheel revolves anti-clockwise the ears will scoop up a certain amount of water which will enter the interior 25 of the rim 23 and due to the centrifugal force the water will leave the interior through the outlets 26 into the atmosphere in the form of a wall of fine mist.

Numeral 27 represents a water inlet pipe, 28 the water outlet pipe and 29 the float operated valve to regulate the amount of water in the reservoir 30 formed in the bottom of the casing 1. The float valve can be of the usual standard construction with the customary float 31 at the end of the lever 32 which is adapted to shut off the water supply when the water reaches a predetermined level. At the inner end of the outlet pipe 33 is a hinged valve 34 spring pressed against the mouth of the outlet pipe 33 by the spring 34a. At the lowermost portion of the valve is a lip 35 to which is attached a rod 36. The upper end of the rod is slotted as at 37 for straddling the float valve lever 32. Numeral 38 designates a cable attached to the rod for manipulating the valve. The cable runs to the exterior of the casing and can be manually or automatically operated.

The operation of the apparatus is as follows:

The raw air is drawn in through the inlet 2 by the high speed fans 6 and 7 and then blown down through the ducts 4 and 5 and over the supply of water 18 where it is given a preliminary treatment by washing out most of the foreign matter and impurities. The treated air then passes upwardly into the chamber 39 as noted in Figure 1 through the spray or mist 40 and thence downwardly into the chamber 41 and next upwardly by the coils 42 and 43 and lastly outwardly through the outlet 3 into the rooms being air conditioned.

According to the way this apparatus is constructed the air must pass directly through the spray or mist 40 and thus be thoroughly cleansed and conditioned. The coil 42 is a heating coil and the coil 43 is a cooling coil. Thus if it is desired to heat the air entering the rooms the coil 42 is turned on and the coil 43 is turned off. Vice versa if it is desired to cool the air the coil 42 is turned off and the coil 43 turned on. In the event it is found that the air entering the rooms contains too much moisture the spray 40 can be shut off by simply pulling on the cable 38 which will open valve 34 and allow the water to pass out through the outlet 33 and thus reduce the water level below the spray wheel. It will be obvious that if the water level is lowered below the spray wheel it will be unable to pick up any water. The cable can be manipulated manually or automatically. In the event the valve 29 commences to leak which will cause the water level to rise above safe limits the float 31 will automatically rise and lift the rod 36 and open the valve 34 thus allowing the excess water to float out before it does any damage.

Having described our invention we claim:

1. In a device of the class described, a casing containing a supply of water, a spray wheel within said casing for forming part of the water into a spray, said spray wheel having a bulged out circular rim near the periphery of the wheel to hold a supply of water and provided with a plurality of inlet holes, ears bent upwardly from the edges of said holes for scooping up the water, and means to allow the supply of water to leave said circular rim under the influence of centrifugal force, said means comprising outlets adjacent said holes and leading from said rim to the periphery of said wheel.

2. In a device of the class described, a casing containing a supply of water, a spray wheel within said casing for forming part of the water into a spray, said spray wheel mounted in said casing and partially dipping in said water, a bulged out circular rim near the periphery of the wheel to hold a supply of water and provided with a plurality of inlet holes, ears bent upwardly from the edges of said holes for scooping up the water, means to allow the supply of water to leave said circular rim under the influence of centrifugal force, said means comprising outlets adjacent said holes and leading from said rim to the periphery of said wheel, and a trough straddling said spray wheel.

JOHN VAN VLIET.
PATRICK J. BROGAN.